(12) United States Patent
Imamura et al.

(10) Patent No.: US 11,774,013 B2
(45) Date of Patent: Oct. 3, 2023

(54) STEPPED PIPE MEMBER AND STEPPED PIPE MEMBER PRODUCTION METHOD

(71) Applicant: Kobe Steel, Ltd., Kobe (JP)

(72) Inventors: Yoshihaya Imamura, Fujisawa (JP); Chieko Imai, Fujisawa (JP)

(73) Assignees: Kobe Steel, Ltd., Kobe (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 489 days.

(21) Appl. No.: 16/623,555

(22) PCT Filed: Jul. 5, 2018

(86) PCT No.: PCT/JP2018/025607
§ 371 (c)(1),
(2) Date: Dec. 17, 2019

(87) PCT Pub. No.: WO2019/009380
PCT Pub. Date: Jan. 10, 2019

(65) Prior Publication Data
US 2021/0148492 A1 May 20, 2021

(30) Foreign Application Priority Data
Jul. 6, 2017 (JP) .................................. 2017-132798

(51) Int. Cl.
*F16L 13/14* (2006.01)
*B21D 51/16* (2006.01)
(Continued)

(52) U.S. Cl.
CPC ............ *F16L 13/141* (2013.01); *B21D 51/16* (2013.01); *B62D 25/145* (2013.01); *B62D 29/008* (2013.01); *F16L 13/14* (2013.01)

(58) Field of Classification Search
CPC ........ F16L 13/141; F16L 13/14; F16L 13/147; F16L 13/16; F16L 13/161
(Continued)

(56) References Cited

U.S. PATENT DOCUMENTS 604,863 A * 5/1898 Hoyer ........................ 285/382.5
638,554 A * 12/1899 Burton ....................... 285/382.2
(Continued)

FOREIGN PATENT DOCUMENTS

DE 19546917 A1 * 6/1996 ............ F16L 13/141
DE 20216611 U1 * 1/2003 ............ F16L 13/141
(Continued)

OTHER PUBLICATIONS

International Search Report dated Oct. 9, 2018 in PCT/JP2018/025607 filed on Jul. 5, 2018, 2 pages.

*Primary Examiner* — Zachary T Dragicevich
*Assistant Examiner* — William S. Choi
(74) *Attorney, Agent, or Firm* — Oblon, McClelland, Maier & Neustadt, L.L.P.

(57) ABSTRACT

Formed in series along an axial-direction end portion of a large-diameter pipe member, in the following order from the pipe end, are: a large-diameter-pipe pipe-end expanding portion; a large-diameter-pipe reduced-diameter portion; a large-diameter-pipe bulging portion; and a tapered portion. Formed in series along an axial-direction end portion of a small-diameter-pipe member, in the following order from the pipe end, are: a small-diameter-pipe pipe-end expanding portion; a small-diameter-pipe enlarged-diameter portion; and a small-diameter-pipe bulging portion. The outer cylindrical surface of the small-diameter-pipe enlarged-diameter portion is in close contact with the inner circumferential surface of the large-diameter-pipe reduced-diameter portion; the inner cylindrical surface of the large-diameter-pipe bulg-
(Continued)

ing portion and the outer circumferential surface of the small-diameter-pipe pipe-end expanding portion are engaged; and the inner circumferential surface of the large-diameter-pipe pipe-end expanding portion and the outer cylindrical surface of the small-diameter-pipe bulging portion are engaged.

5 Claims, 6 Drawing Sheets

(51) Int. Cl.
    *B62D 25/14*     (2006.01)
    *B62D 29/00*     (2006.01)

(58) Field of Classification Search
    USPC ............ 285/382, 382.1, 382.2, 382.3, 382.4, 285/382.5, 382.7
    See application file for complete search history.

(56) References Cited

U.S. PATENT DOCUMENTS

| | | | | |
|---|---|---|---|---|
| 3,561,251 | A | * | 2/1971 | Matsumoto ........... F16L 13/161 285/382.2 |
| 6,065,317 | A | * | 5/2000 | Steingroever |
| 2007/0108765 | A1 | * | 5/2007 | Hayakawa .................... 285/382 |
| 2016/0200087 | A1 | * | 7/2016 | Doerr |
| 2016/0362829 | A1 | * | 12/2016 | Jung ..................... F16L 13/141 |

FOREIGN PATENT DOCUMENTS

| | | | |
|---|---|---|---|
| JP | 8-2289 A | 1/1996 | |
| JP | 10-99922 A | 4/1998 | |
| JP | 11-47855 A | 2/1999 | |
| WO | WO-2015055626 A1 * | 4/2015 | ............ F16L 13/141 |

* cited by examiner

STEPPED PIPE MEMBER AND STEPPED PIPE MEMBER PRODUCTION METHOD

TECHNICAL FIELD

The present invention relates to a stepped pipe member in which pipes of different diameters are joined to each other. The present invention also relates to a stepped pipe member production method.

BACKGROUND ART

In many cases, steel members are used for structural components of automobiles from the viewpoints of the cost and workability for, for example, welding. Nowadays, to address demands for improvement of fuel efficiency, parts of structural components of automobiles including steel members have been replaced with light weight members. In addition to panel members, use of light weight members has been discussed for frame members. In structural members such as frames and reinforcements, stepped members, which are formed by joining, in series, pipe-shaped members of different diameters, may be used for parts of structures. Such members are referred to as "stepped pipe members" herein.

As a stepped pipe member production method, there exists a method to which the following processing is applied: one end of a large-diameter pipe member is drawn so as make an inner diameter of the large-diameter pipe member match an outer diameter of a small-diameter pipe. For example, a technique with which drawing is performed by swaging is known (PTL 1). Furthermore, another technique has been discussed. With this technique, one end of a large-diameter pipe member is press formed in the radial direction to form a joining portion having a plurality of flanges, and holes are formed in part of a pressed portion. A small-diameter pipe member is welded by using the holes, thereby a stepped pipe member is produced (PTL 2).

CITATION LIST

Patent Literature

PTL 1: Japanese Unexamined Patent Application Publication No. 10-99922
PTL 2: Japanese Unexamined Patent Application Publication No. 8-2289

SUMMARY OF INVENTION

Technical Problem

According to the technique of PTL 1, the dimensions and, in particular, a pipe shape on an inner circumferential side becomes unstable at a distal end portion of the large-diameter pipe member formed by drawing. This may cause, during insertion of the small-diameter pipe member into the distal end portion of the large-diameter pipe member, the small-diameter pipe member to be caught, and accordingly, assembly efficiency may be reduced. Furthermore, cracking may occur in the large-diameter pipe member depending on the processing conditions.

In contrast, in the joining portion according to the technique described in PTL 2, there is no problem with the shape or dimensional accuracy of a distal end portion that would be arisen by swaging. However, according to the technique described in PTL 2, the small-diameter pipe member is inserted into the joining portion, and the large-diameter pipe member and the small-diameter pipe member are welded to each other by using the holes formed in the large-diameter pipe member.

Thus, work for forming the holes and welding is increased. In addition, the amount of heat input to the joining portion may increase depending on the welding conditions. As a result, in some cases, dimensional accuracy of the entirety of the stepped pipe member is degraded due to thermal strain generated in various portions. This may reduce ease of mounting the stepped pipe member to a member to which the stepped pipe member is to be mounted.

The present invention solves the above-described problem, and an object of the present invention is to provide a stepped pipe member with which good assembly efficiency and good mounting accuracy are obtained. The object of the present invention is also to provide a stepped pipe member production method.

Solution to Problem

The present invention has structures described below.

(1) A stepped pipe member includes a connection in which one end portion of a large-diameter pipe member in an axial direction is secured to one end portion, in the axial direction, of a small-diameter pipe member having a smaller diameter than a diameter of the large-diameter pipe member.

In the stepped pipe member, a large-diameter-pipe pipe-end expanding portion, a large-diameter-pipe reduced-diameter portion having a smaller diameter than a diameter of the large-diameter-pipe pipe-end expanding portion, a large-diameter-pipe bulging portion having a larger diameter than the diameter of the large-diameter-pipe reduced-diameter portion, and a tapered portion a maximum diameter of which is larger than the maximum diameter of the large-diameter-pipe bulging portion are formed at the one end portion, in the axial direction, of the large-diameter pipe member so as to be continuous with one another in this order from a pipe end.

Also in the stepped pipe member, a small-diameter-pipe pipe-end p expanding portion, a small-diameter-pipe enlarged-diameter portion having a smaller diameter than a diameter of the small-diameter-pipe pipe-end expanding portion, and a small-diameter-pipe bulging portion having a larger diameter than the diameter of the small-diameter-pipe enlarged-diameter portion are formed at the one end portion, in the axial direction, of the small-diameter pipe member so as to be continuous with one another in this order from a pipe end.

Also in the stepped pipe member, an inner circumferential surface of the large-diameter-pipe reduced-diameter portion is in close contact with an outer circumferential surface of the small-diameter-pipe enlarged-diameter portion, an inner circumferential surface of the large-diameter-pipe bulging portion is engaged with an outer circumferential surface of the small-diameter-pipe pipe-end expanding portion, and an inner circumferential surface of the large-diameter-pipe pipe-end expanding portion is engaged with an outer circumferential surface of the small-diameter-pipe bulging portion.

In this stepped pipe member, the small-diameter-pipe enlarged-diameter portion is radially expanded and in close contact with the inner circumferential surface of the large-diameter-pipe reduced-diameter portion in the connection. Also in this connection, the outer circumferential surface of the small-diameter-pipe pipe-end expanding portion is in close contact with and engaged with the inner circumferential surface of the large-diameter-pipe bulging portion, and the outer circumferential surface of the small-diameter-pipe bulging portion is in close contact with and engaged with the inner circumferential surface of the large-diameter-pipe pipe-end expanding portion. These closely contacting structures and engagement structures can be formed by securing by radial expansion and swaging performed after the small-diameter pipe member has been inserted into the large-diameter pipe member. Accordingly, the securing can be achieved by easy insertion work for the small-diameter pipe member and the large-diameter pipe member, and there is no reduction in assembly efficiency caused when the small-diameter pipe member is caught during the insertion. Furthermore, since the small-diameter pipe member is in close contact with the inner circumferential surface of the large-diameter pipe member, the likelihood of cracking is reduced.

Since need of a weld joint can be dropped, degradation of dimensional accuracy due to thermal strain caused by welding does not occur.

(2) In the stepped pipe member of (1), a stiff member is secured to an outer circumferential surface of the large-diameter-pipe reduced-diameter portion.

In this stepped pipe member, when the radially expanded small-diameter-pipe enlarged-diameter portion is brought into close contact with the inner circumferential surface of the large-diameter-pipe reduced-diameter portion and presses the large-diameter-pipe reduced-diameter portion outward in the radial direction, the stiff member is swaged to the large-diameter-pipe reduced-diameter portion, and the large-diameter pipe member and the small-diameter pipe member are simultaneously secured to the stiff member.

(3) A stepped pipe member production method includes the step of preparing a large-diameter pipe member having, at one end portion in an axial direction, a tapered portion a diameter of which reduces toward a pipe end and a reduced-diameter pipe portion which extends from a reduced diameter side of the tapered portion toward the pipe end.

The method also includes the step of inserting a small-diameter pipe member having a smaller diameter than a diameter of the reduced-diameter pipe portion into the reduced-diameter pipe portion.

The method also includes the step of forming a connection where the large-diameter pipe member is connected to the small-diameter pipe member by radially expanding the small-diameter pipe member at least in a region facing the reduced-diameter pipe portion. The preparing the large-diameter pipe member, the inserting the small-diameter pipe member, and the forming the connection are performed sequentially in this order.

In the forming the connection, an inner circumferential surface of a large-diameter-pipe reduced-diameter portion formed by radially expanding the reduced-diameter pipe portion is brought into close contact with an outer circumferential surface of the small-diameter pipe member, an outer circumferential surface of a small-diameter-pipe pipe-end expanding portion formed by radially expanding a pipe end of the small-diameter pipe member is brought into engagement with an inner circumferential surface of a large-diameter-pipe bulging portion formed by radially expanding a region of the large-diameter pipe member facing the small-diameter-pipe pipe-end expanding portion, and an inner circumferential surface of a large-diameter-pipe pipe-end expanding portion formed by radially expanding the pipe end of the large-diameter pipe member is brought into engagement with an outer circumferential surface of a small-diameter-pipe bulging portion formed by radially expanding a region of the small-diameter pipe member facing the large-diameter-pipe pipe-end expanding portion.

With this stepped pipe member production method, the securing by radial expansion and swaging is performed after the small-diameter pipe member has been inserted into the large-diameter pipe member. Thus, unlike related-art drawing, the shape is not unstabilized, and accordingly, assembly efficiency is not reduced. Furthermore, unlike related-art joining by welding, the amount of heat input due to welding is not generated, and accordingly, degradation of dimensional accuracy due to thermal strain does not occur. Furthermore, since work for setting a tool for suppressing thermal strain caused by welding is eliminated, productivity is improved.

(4) In the stepped pipe member production method of (3), the small-diameter pipe member is formed of an aluminum alloy, and In the forming the connection, a coil is inserted into the small-diameter pipe member so as to radially expand the small-diameter pipe member by using electromagnetic forming.

With this stepped pipe member production method, when power is supplied to the coil, the small-diameter pipe member is radially expanded by the generated Lorentz force, thereby the small-diameter pipe member is secured by radial expansion and swaging to the region facing the diameter-reduced pipe portion of the large-diameter pipe member. Also at this time, the small-diameter-pipe pipe-end expanding portion and the small-diameter-pipe bulging portion can be formed in the small-diameter pipe member. Furthermore, the large-diameter-pipe pipe-end expanding portion and the large-diameter-pipe bulging portion can be formed in the large-diameter pipe member. Regarding these, the small-diameter-pipe bulging portion can be brought into close contact with the inner circumferential surface of the large-diameter-pipe bulging portion and the small-diameter-pipe bulging portion can be brought into close contact with the inner circumferential surface of the large-diameter-pipe pipe-end expanding portion by the operation in which the small-diameter pipe member is radially expanded.

(5) In the stepped pipe member production method of (3) or (4), the small-diameter pipe member is formed of a heat treatment-type aluminum alloy, the small-diameter pipe member is radially expanded in a T1 tempering state, and the small-diameter pipe member is subjected to artificial aging treatment after the small-diameter pipe member has been radially expanded.

With this stepped pipe member production method, the amount of the radial expansion can be increased by the T1 tempering, and swaging strength can be improved. Furthermore, the artificial aging after that can improve the strength of the material. As a result, the strength of the swaged and joined portion of the stepped pipe member can be further improved.

Advantageous Effects of Invention

According to the present invention, the stepped pipe member that is easily assembled and highly accurately mounted is obtained.

DESCRIPTION OF EMBODIMENTS

Hereinafter, an embodiment of the present invention will be described in detail with reference to the drawings.

Although a reinforcement beam member provided in an instrument panel of an automobile is described herein as an example of a stepped pipe member according to the present invention, this is not limiting.

<Structure of An Instrument Panel Reinforcement>

Figure 1:
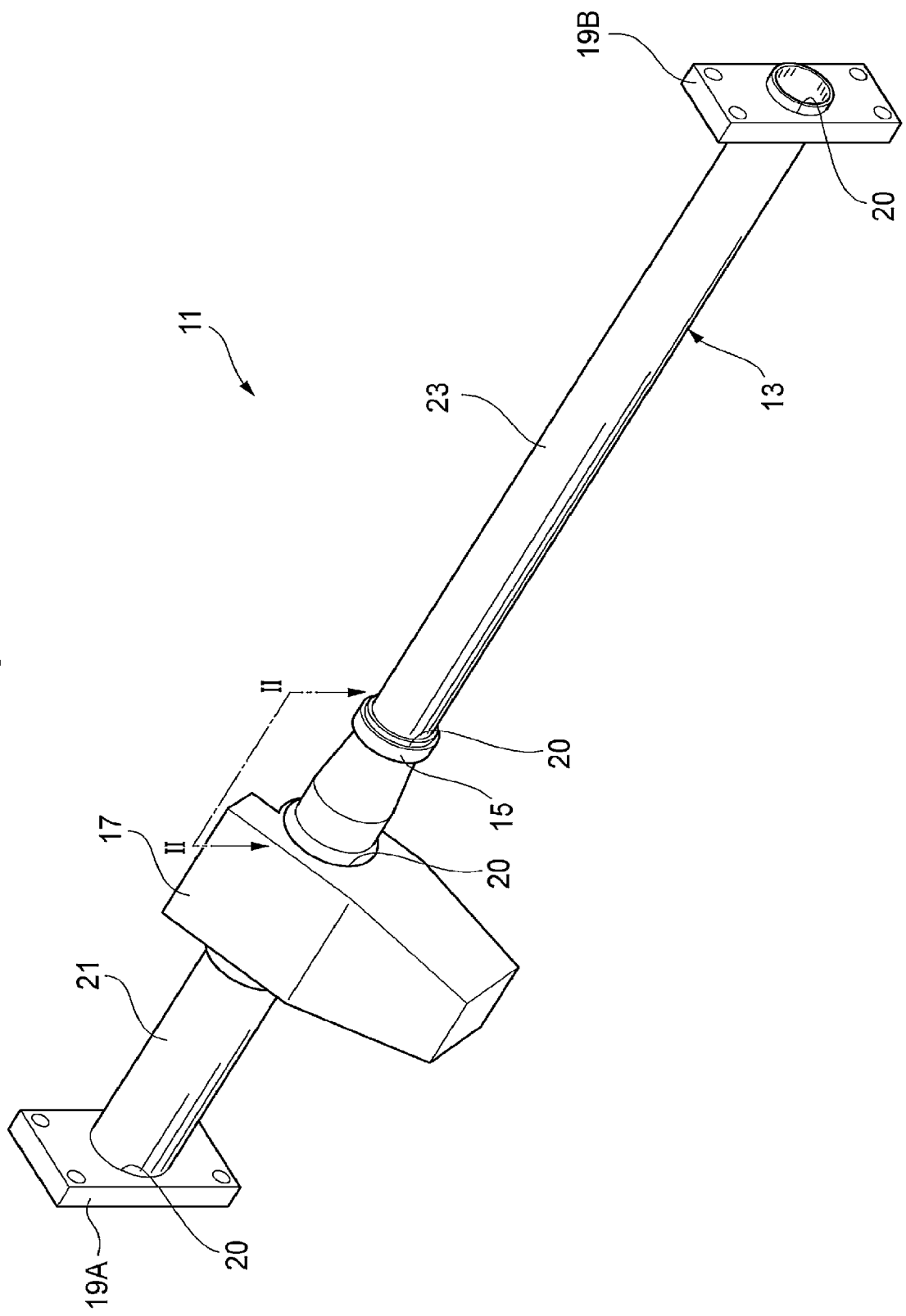
FIG. 1 is a schematic external perspective view of an instrument panel reinforcement.

FIG. 1 is a schematic external perspective view of an instrument panel reinforcement.

An instrument panel reinforcement 11 includes a beam member 13 as the stepped pipe member, a bracket 15 and a steering column bracket 17 provided on an outer circumference of the beam member 13, and attachment brackets 19A, 19B provided at both ends of the beam member 13. The bracket 15, the steering column bracket 17, and the attachment brackets 19A, 19B have respective through holes 20. The beam member 13 is secured in a state in which the beam member 13 is inserted through the through holes 20.

The instrument panel reinforcement 11 is secured to a body of the automobile with the attachment brackets 19A, 19B interposed therebetween. Furthermore, a steering device is supported by the steering column bracket 17.

In the beam member 13, a large-diameter pipe member 21 and a small-diameter pipe member 23 having a smaller diameter than the diameter of the large-diameter pipe member 21 are radially expanded and swaged so as to be secured to an inner diameter portion of the bracket 15.

<Large-Diameter Pipe Member>

The original pipe of the large-diameter pipe member 21 before being formed into the large-diameter pipe member 21 is not limited to a circular pipe and may be a quadrangular pipe having a square shape or a rectangular shape in section, a hexagonal pipe having a hexagonal shape in section, or an octagonal pipe having a octagonal shape in section. The original pipe can be produced by extrusion or by welding a sheet material. Preferably, the pipes to be combined with each other are formed to have the shapes the same as or similar to each other. For example, when the sectional shape of the large-diameter pipe member 21 is circular, the section shape of a reduced-diameter pipe portion, which will be described later, is also circular similarly to the large-diameter pipe member 21. However, pipes having different shapes in section may be combined with each other.

The material of the large-diameter pipe member 21 can be appropriately selected from among steel materials (ordinary steel, high tensile steel), aluminum alloys (JIS 6000 series, 7000 series, and the like), resin, and so forth.

<Small-Diameter Pipe Member>

The original pipe of the small-diameter pipe member 23 before being formed into the small-diameter pipe member 23 is not limited to a circular pipe and may be a quadrangular pipe having a square shape or a rectangular shape in section, a hexagonal pipe having a hexagonal shape in section, or an octagonal pipe having a octagonal shape in section. The original pipe can be produced by extrusion or by welding a sheet material. Furthermore, in the case of an extruded material, a structure expanding outward such as a rib may be provided. However, when the small-diameter pipe member 23 has a rib, the rib is preferably cut from a pipe end 23a of the small-diameter pipe member 23 such that the rib does not expand outward. Examples of a preferred material of the small-diameter pipe member 23 include aluminum alloys (JIS 6000 series, 7000 series, and the like).

<Brackets>

Various types of brackets including the bracket 15 attached to the beam member 13 include stiff members. Examples of a preferred material of the stiff members include steel, extruded aluminum materials, aluminum castings, injection molded resin materials, and so forth.

<Steps of Securing by Radially Expanding and Swaging>

Hereinafter, steps of securing by radially expanding and swaging, by using the bracket 15, the large-diameter pipe member 21 and the small-diameter pipe member 23 of the beam member 13 are briefly described. Preferably, the securing by radially expanding and swaging is performed by the electromagnetic forming particularly from the viewpoints of productivity and so forth.

Figure 2:
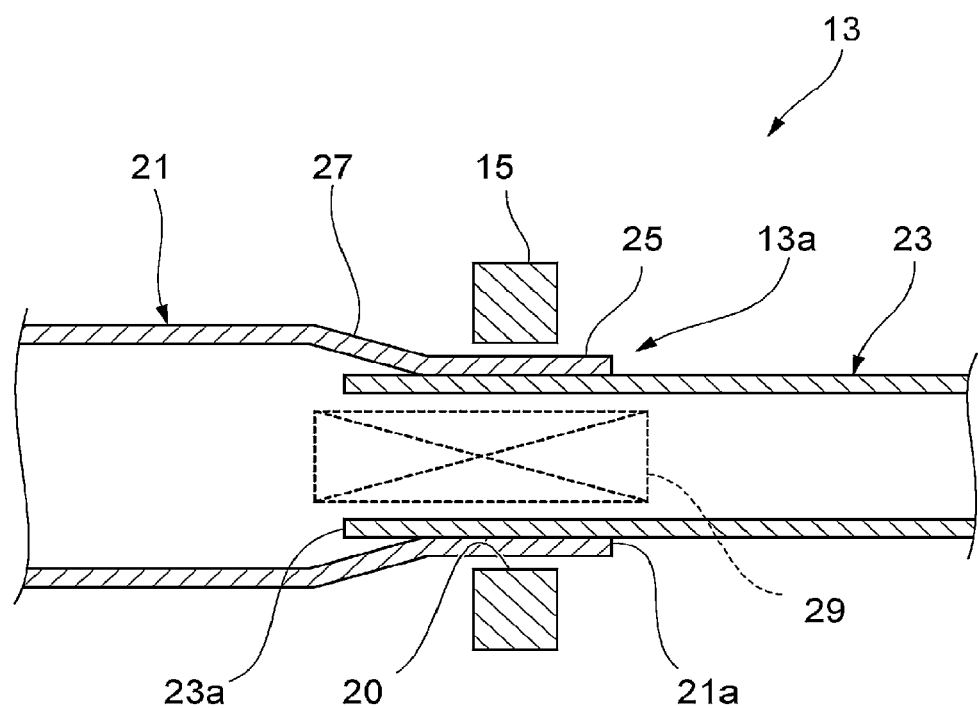
FIG. 2 is a sectional view, taken along line II-II illustrated in FIG. 1, of a main portion of a beam member before electromagnetic forming is performed.

FIG. 2 is a sectional view, taken along line 11-11 illustrated in FIG. 1, of a main portion of the beam member 13 before electromagnetic forming is performed.

In the beam member 13, the large-diameter pipe member 21 and the small-diameter pipe member 23 are coaxially joined to each other. First, the large-diameter pipe member 21 having a tapered portion 27 and a reduced-diameter pipe portion 25 is prepared. The diameter of the tapered portion 27 reduces toward a pipe end 21a being one end portion in the axial direction. The reduced-diameter pipe portion 25 extends from a reduced diameter side of the tapered portion 27 toward the pipe end 21a. The reduced-diameter pipe portion 25 and the tapered portion 27 are formed by performing, for example, press forming, swaging, or the like on the large-diameter pipe member 21.

The pipe end 23a being one of ends of the small-diameter pipe member 23 is inserted into the pipe end 21a being one of ends of the large-diameter pipe member 21. The large-diameter pipe member 21 and the small-diameter pipe member 23 are superposed on each other between the pipe end 21a of the large-diameter pipe member 21 and the pipe end 23a of the small-diameter pipe member 23 in the axial direction.

The bracket 15 is disposed radially outside the reduced-diameter pipe portion 25 which is inserted through the through holes 20 of the bracket 15. An electromagnetic forming coil 29 is disposed at a position in the axial direction facing the bracket 15 inside the pipes of the large-diameter pipe member 21 and the small-diameter pipe member 23.

Figure 3:
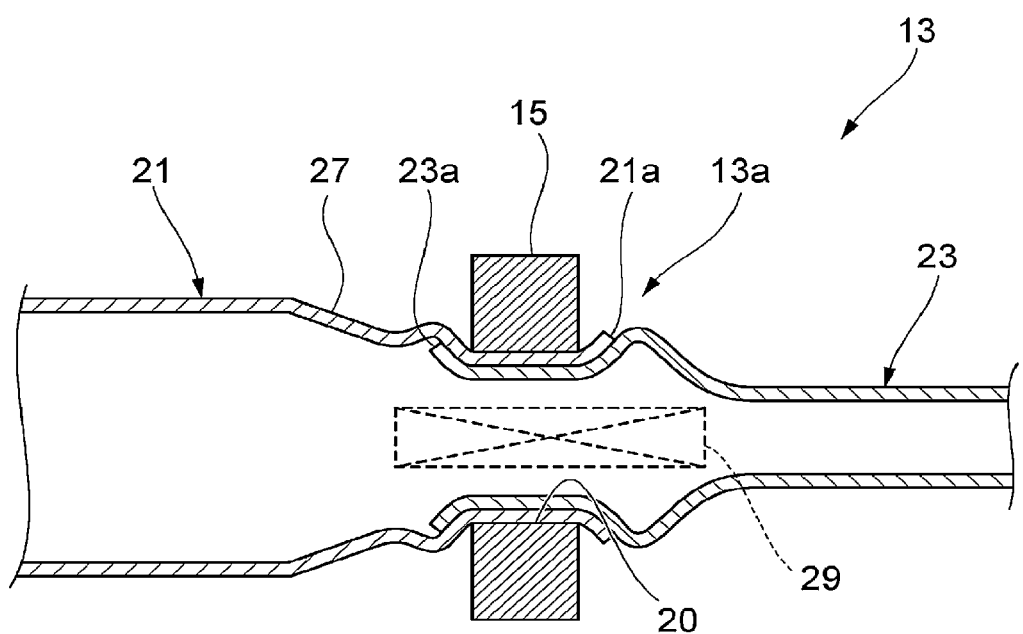
FIG. 3 is a sectional view of the main portion of the beam member illustrated in FIG. 2 after the electromagnetic forming has been performed.

FIG. 3 is a sectional view of the main portion of the beam member 13 illustrated in FIG. 2 after the electromagnetic forming has been performed. By the Lorentz force generated by supplying power to the electromagnetic forming coil 29, a region of the small-diameter pipe member 23 facing the electromagnetic forming coil 29 is radially expanded. In so doing, although the Lorentz force is not generated in the large-diameter pipe member 21, the large-diameter pipe member 21 is expanded at a region thereof superposed on the expanded region of the small-diameter pipe member 23 by a force radially expanding the small-diameter pipe member 23.

Figure 4:
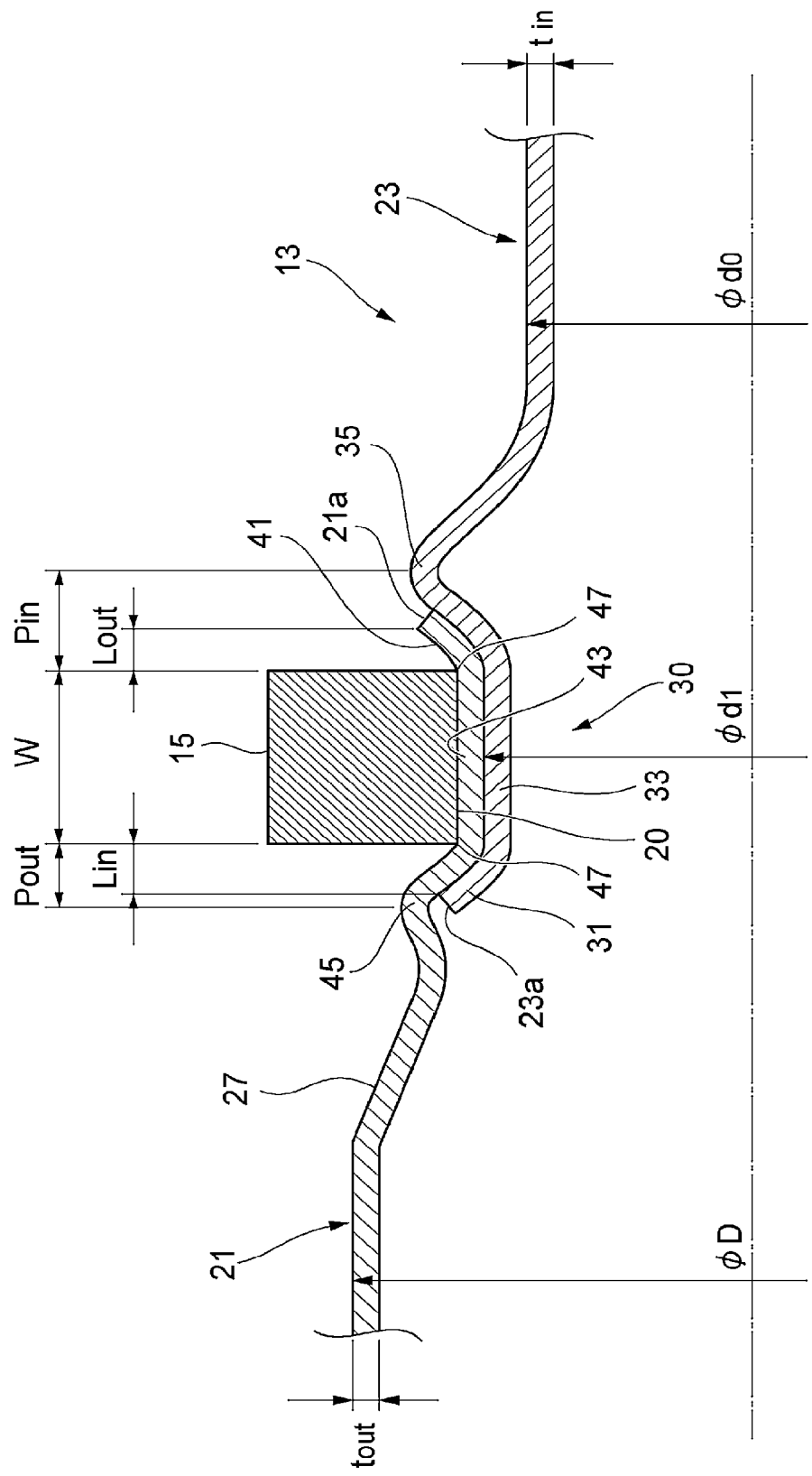
FIG. 4 is an enlarged sectional view of the main portion of the beam member after radial expansion has been performed.

FIG. 4 is an enlarged sectional view of the main portion of the beam member 13 after the radial expansion has been performed. In the beam member 13 having undergone the electromagnetic forming, an inner circumferential surface of a large-diameter-pipe reduced-diameter portion 43 is in close contact with an outer circumferential surface of a small-diameter-pipe enlarged-diameter portion 33. Also in the beam member 13, an inner circumferential surface of a large-diameter-pipe bulging portion 45 is engaged with an outer circumferential surface of a small-diameter-pipe pipe-end expanding portion 31, and an inner circumferential surface of a large-diameter-pipe pipe-end expanding portion 41 is engaged with an outer circumferential surface of a small-diameter-pipe bulging portion 35.

Furthermore, in the beam member 13, in a connection 30 where the large-diameter pipe member 21 is connected to the small-diameter pipe member 23, an outer circumferential surface of the large-diameter-pipe reduced-diameter portion 43 is radially expanded and swaged so as to be secured to an inner circumferential surface of the through holes 20 of the bracket 15.

The beam member 13 having the above-described structure has features listed below. That is, the small-diameter-pipe pipe-end expanding portion 31, the small-diameter-pipe enlarged-diameter portion 33 having a smaller diameter than the diameter of the small-diameter-pipe pipe-end expanding portion 31, and the small-diameter-pipe bulging portion 35 having a larger diameter than the diameter of the small-diameter-pipe enlarged-diameter portion 33 are formed at the pipe end 23a of the radially expanded small-diameter pipe member 23 so as to be continuous with one another in this order from the pipe end 23a. The outer diameter of the small-diameter pipe member 23 before the radial expansion is $\phi d_0$, and the small-diameter-pipe enlarged-diameter portion 33 has an outer diameter $\phi d_1$ that is larger than $\phi d_0$ ($\phi d_0 < \phi d_1$).

The large-diameter-pipe pipe-end expanding portion 41, the large-diameter-pipe reduced-diameter portion 43 having a smaller diameter than the diameter of the large-diameter-pipe pipe-end expanding portion 41, the large-diameter-pipe bulging portion 45 having a larger maximum diameter than the diameter of the large-diameter-pipe reduced-diameter portion 43, and the tapered portion 27, the maximum diameter of which is larger than the maximum diameter of the large-diameter-pipe bulging portion 45, and the minimum diameter of which is smaller than the maximum diameter of the large-diameter-pipe bulging portion 45, are formed at the pipe end 21a of the radially expanded large-diameter pipe member 21 so as to be continuous with one another in this order from the pipe end 21a. The large-diameter pipe member 21 is the original pipe having an outer diameter $\phi D$, and a large diameter side of the tapered portion 27 has the outer diameter $\phi D$ that is larger than the maximum diameter of the large-diameter-pipe bulging portion 45.

Both ends of the large-diameter-pipe reduced-diameter portion 43 in the axial direction are in contact with inner circumferential edges 47 of the bracket 15 in the axial direction and are radially outwardly bent. The inner circumferential edges 47 of the bracket 15 in the axial direction serve as boundaries between the large-diameter-pipe pipe-end expanding portion 41 and the large-diameter-pipe reduced-diameter portion 43 and between the large-diameter-pipe bulging portion 45 and the large-diameter-pipe reduced-diameter portion 43.

An expanding length $L_{out}$ of the large-diameter-pipe pipe-end expanding portion 41 from the bracket 15 and an expanding length $L_{in}$ of the small-diameter-pipe pipe-end expanding portion 31 from the bracket 15 are 5 to 30%, preferably 8 to 20%, and more preferably 10 to 12% of a width W of the bracket 15 in the axial direction.

A length $P_{out}$ from the top of the large-diameter-pipe bulging portion 45 to the bracket 15 is larger than the expanding length $L_{in}$. A length $P_{in}$ from the top of the small-diameter-pipe bulging portion 35 to the bracket 15 is larger than the expanding length $L_{out}$.

Furthermore, a thickness $t_{out}$ of the large-diameter pipe member 21 is larger than a thickness $t_{in}$ of the small-diameter pipe member 23.

<Production Method for the Beam Member>

Next, more specific production method for the beam member 13 having the above-described structure is described.

Figure 5:
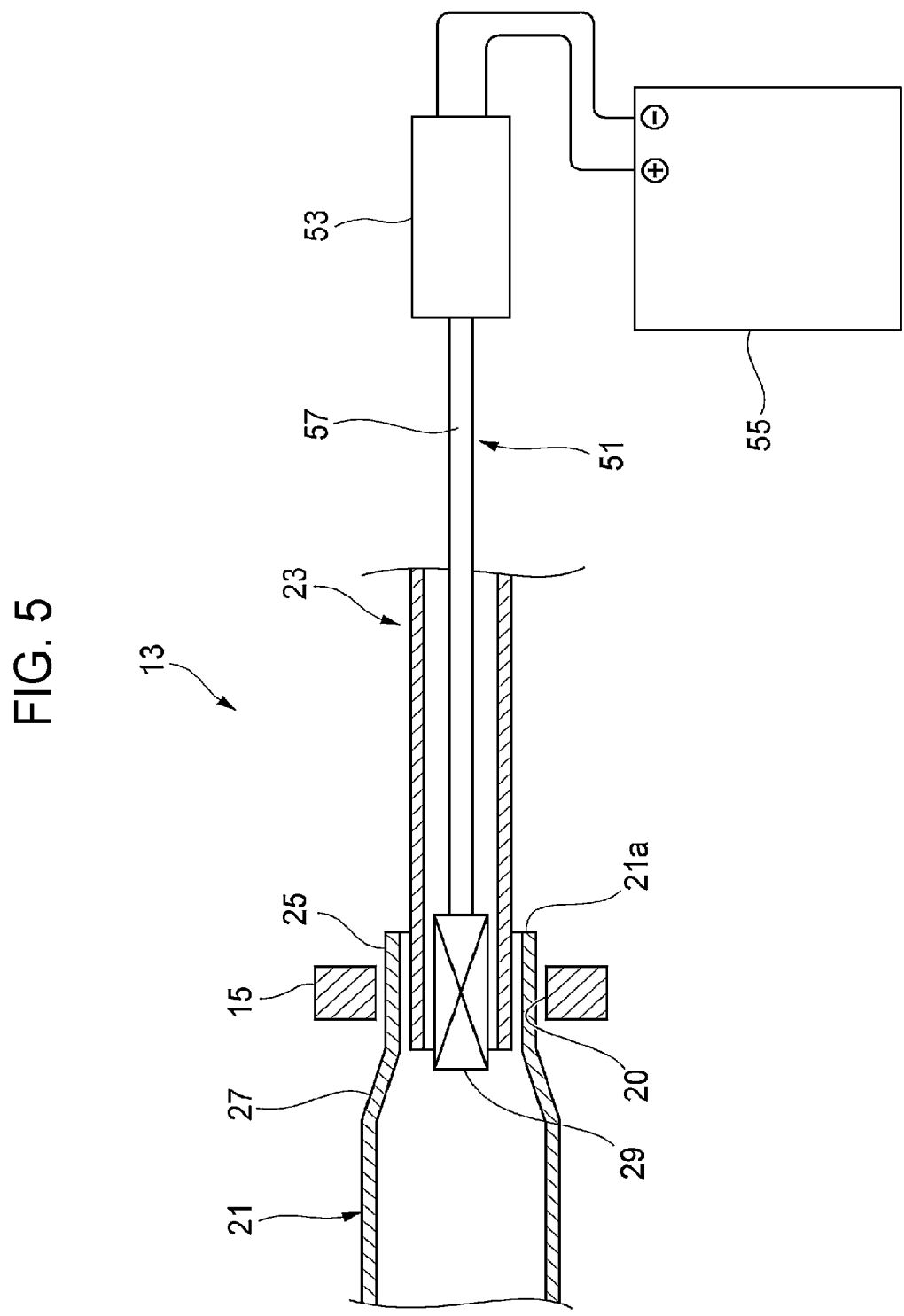
FIG. 5 is an explanatory view of steps schematically illustrating how a large-diameter pipe member and a small-diameter pipe member are radially expanded and swaged so as to be secured to each other by the electromagnetic forming.

FIG. 5 is an explanatory view of the steps schematically illustrating how the large-diameter pipe member 21 and the small-diameter pipe member 23 are radially expanded and swaged so as to be secured to each other by electromagnetic forming.

As illustrated in FIG. 2 having been described, the pipe end 23a of the small-diameter pipe member 23 is inserted into the pipe end 21a of the large-diameter pipe member 21, and the bracket 15 is disposed in a region where the large-diameter pipe member 21 and the small-diameter pipe member 23 are superposed on each other. Then, a rod-shaped coil unit 51 in which the electromagnetic forming coil 29 is provided at a distal end of a support 57 formed of resin is inserted into the small-diameter pipe member 23. At this time, preferably, the electromagnetic forming coil 29 of the coil unit 51 is coaxial with the small-diameter pipe member 23, the reduced-diameter pipe portion 25 of the large-diameter pipe member 21, and an inner circumferential surface of the through hole 20 of the bracket 15. In this case, a gap between an outer circumferential surface of the electromagnetic forming coil 29 and an inner circumferential surface of the small-diameter pipe member 23, a gap between an outer circumferential surface of the small-diameter pipe member 23 and an inner circumferential surface of the reduced-diameter pipe portion 25 of the large-diameter pipe member 21, and a gap between an outer circumferential surface of the reduced-diameter pipe portion 25 and the inner circumferential surface of the through hole 20 of the bracket 15 are formed uniformly in the circumferential direction.

The electromagnetic forming coil 29 is formed by winding a conductor element wire around insulating resin, and further, the conductor element wire is surrounded by insulating resin. The electromagnetic forming coil 29 is secured at the distal end of the support 57. Conductor wires are inserted through the inside of the support 57 and connected to an external power source 55.

The coil unit 51 may be manually inserted into the pipe. Alternatively, the coil unit 51 may be moved in the axial direction by using a coil moving mechanism 53 including a known linear moving mechanism.

The coil unit 51 having been inserted into the small-diameter pipe member 23 is positioned such that, as illustrated in FIG. 5, the electromagnetic forming coil 29 corresponds to a portion where the large-diameter pipe member 21 and the small-diameter pipe member 23 are superposed on each other, that is, the bracket 15.

In this state, the power is supplied to the electromagnetic forming coil 29 by the power source 55. As a result, the Lorentz force generated by the electromagnetic forming coil 29 radially expands a region of the small-diameter pipe member 23 facing the electromagnetic forming coil 29. Due to this radial expansion of the small-diameter pipe member 23, the reduced-diameter pipe portion 25 being a region of the large-diameter pipe member 21 facing the small-diameter pipe member 23 abuts the inner circumferential surface of the through hole 20 of the bracket 15. Accordingly, the large-diameter pipe member 21 and the small-diameter pipe member 23 are radially expanded and swaged so as to be secured to the bracket 15.

The state of securing by radially expanding and swaging is described in greater detail.

The outer circumferential surface of the small-diameter-pipe enlarged-diameter portion 33 illustrated in FIG. 4 is in close contact with the inner circumferential surface of the large-diameter-pipe reduced-diameter portion 43 while being pressed against the inner circumferential surface of the large-diameter-pipe reduced-diameter portion 43 due to diameter enlargement of the small-diameter-pipe enlarged-diameter portion 33. Furthermore, the outer circumferential surface of the large-diameter-pipe reduced-diameter portion 43 is in close contact with the inner circumferential surface of the through hole 20 of the bracket 15 while being pressed against the inner circumferential surface of the through hole 20 of the bracket 15 due to diameter enlargement of the small-diameter-pipe enlarged-diameter portion 33.

The small-diameter-pipe pipe-end expanding portion 31 and the small-diameter-pipe bulging portion 35 are formed in a portion of the small-diameter pipe member 23 radially outside the bracket 15 by diameter enlargement in the radial direction. Furthermore, when a portion of the small-diameter pipe member 23 facing the electromagnetic forming coil 29 is radially expanded, this radial expansion causes the large-diameter pipe member 21 to be deformed outward in the radial direction. That is, in the large-diameter pipe member 21, the large-diameter-pipe bulging portion 45 is formed by the enlargement of the small-diameter-pipe pipe-end expanding portion 31 and the large-diameter-pipe pipe-end expanding portion 41 is formed by the enlargement of the small-diameter-pipe bulging portion 35. Thus, the outer circumferential surface of the small-diameter-pipe pipe-end expanding portion 31 and the inner circumferential surface of the large-diameter-pipe bulging portion 45 are joined to each other while being engaged with each other throughout the circumference of the pipes. Furthermore, the outer circumferential surface of the small-diameter-pipe bulging portion 35 and the inner circumferential surface of the large-diameter-pipe pipe-end expanding portion 41 are joined to each other while being engaged with each other throughout the circumferences of the pipes.

The electromagnetic forming coil 29 is coaxial with the small-diameter pipe member 23, the reduced-diameter pipe portion 25 of the large-diameter pipe member 21, and the inner circumferential surface of the through hole 20 of the bracket 15. Accordingly, the Lorentz force generated by supplying the power to the electromagnetic forming coil 29 acts on the small-diameter pipe member 23 uniformly in the circumferential direction. Thus, a radially expanding force from the small-diameter pipe member 23 to the reduced-diameter pipe portion 25 of the large-diameter pipe member 21 and a radially expanding force from the reduced-diameter pipe portion 25 to the bracket 15 are uniform in the circumferential direction, thereby joining with uniform strength is achieved through the circumferences of the pipes.

The large-diameter pipe member 21 and the small-diameter pipe member 23 are solidly secured to each other by the above-described engagement between the small-diameter-pipe pipe-end expanding portion 31 and the large-diameter-pipe bulging portion 45 and the above-described engagement between the small-diameter-pipe bulging portion 35 and the large-diameter-pipe pipe-end expanding portion 41. Thus, strength of the large-diameter pipe member 21 and the small-diameter pipe member 23 against distortion, bent, and tension is improved, and joining quality is improved. Furthermore, swaging together with the bracket 15 improves the stiffness and prevents removal of the large-diameter pipe member 21 and the small-diameter pipe member 23 in the axial direction.

Figure 6:
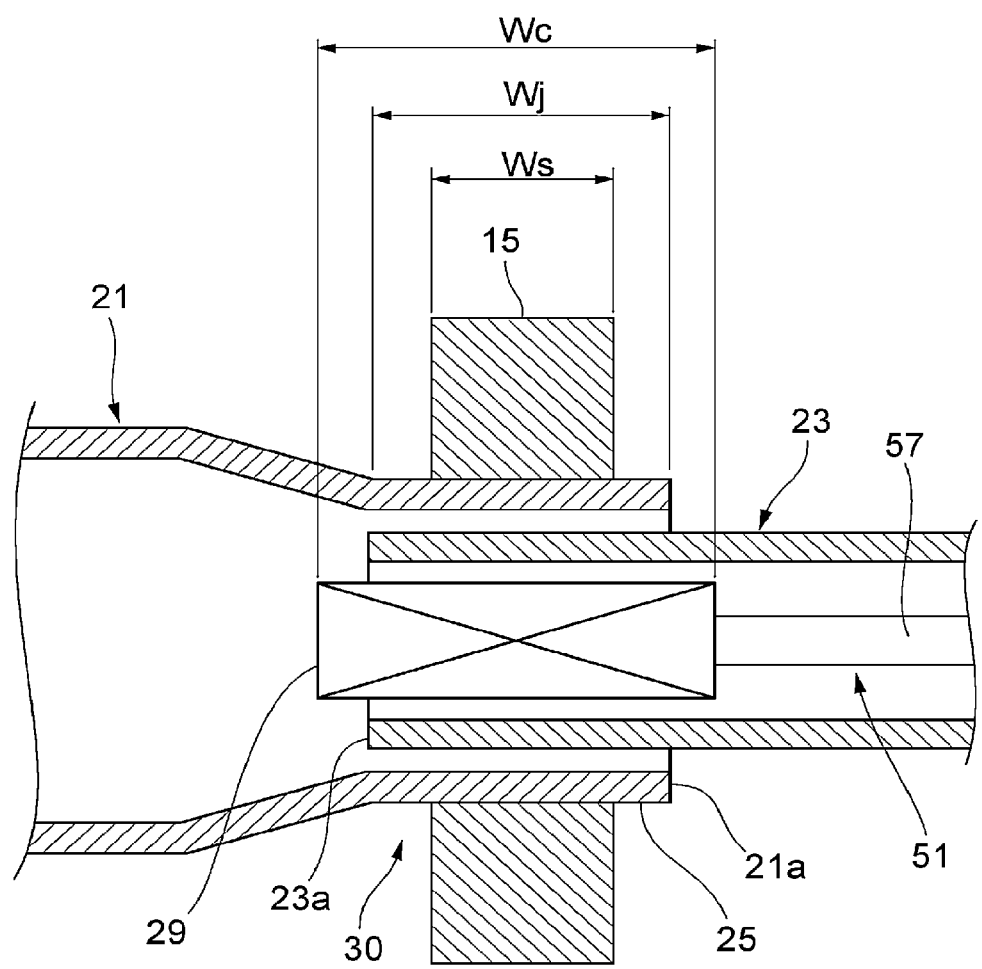
FIG. 6 is an explanatory view illustrating the positional relationships between an electromagnetic forming coil, the large-diameter pipe member, the small-diameter pipe member, and a bracket.

FIG. 6 is an explanatory view illustrating the positional relationships between the electromagnetic forming coil 29, the large-diameter pipe member 21, the small-diameter pipe member 23, and the bracket 15. Preferably, the electromagnetic forming coil 29 is disposed at a position that is fixed relative to the large-diameter pipe member 21, the small-diameter pipe member 23, and the bracket 15.

Here, the length of the bracket 15 in the axial direction is represented as Ws and the length of the electromagnetic forming coil 29 in the axial direction is represented as Wc. Furthermore, the length of the connection 30 from the pipe end 21a of the large-diameter pipe member 21 to the pipe end 23a of the small-diameter pipe member 23 in the axial direction is represented as Wj. Preferably, Ws, Wj, Wc described above are disposed in regions superposed on one another, and Ws<Wj<Wc. However, an insertion distal end of the electromagnetic forming coil 29 projects outward in the axial direction from the pipe end 23a of the small-diameter pipe member 23.

With such relative dispositions, the small-diameter-pipe pipe-end expanding portion 31, the small-diameter-pipe bulging portion 35, the large-diameter-pipe pipe-end expanding portion 41, and the large-diameter-pipe bulging portion 45 described above can be electromagnetic formed into preferable shapes illustrated in FIG. 4.

<Tempering of the Large-Diameter Pipe Member and the Small-Diameter Pipe Member>

When the large-diameter pipe member 21 and the small-diameter pipe member 23 are formed of a heat treatment-type aluminum alloy, it is preferable that heat treatment such as solution treatment be performed on the large-diameter pipe member 21 and the small-diameter pipe member 23 after the above-described electromagnetic forming.

When the large-diameter pipe member 21 and the small-diameter pipe member 23 are formed of an extruded material, it is preferable that the large-diameter pipe member 21 and the small-diameter pipe member 23 be radially expanded in the T1 tempering state in which the large-diameter pipe member 21 and the small-diameter pipe member 23 are quenched after the extrusion, and, the large-diameter pipe member 21 and the small-diameter pipe member 23 having been radially expanded be subjected to artificial aging treatment. With the T1 tempering, the amount of the radial expansion can be increased and joining strength of swaging of the stepped pipe member can be improved. Furthermore, by performing the artificial aging, the strength of the material can be improved. Accordingly, the strength of the connection 30 can be further improved.

<Operation and Effect of the Stepped Pipe Member>

In the beam member 13 having the structure described herein, the small-diameter-pipe pipe-end expanding portion 31, the small-diameter-pipe enlarged-diameter portion 33, and the small-diameter-pipe bulging portion 35 are each in close contact with the large-diameter pipe member 21 and radially expanded and swaged so as to be secured to the large-diameter pipe member 21. Accordingly, since the small-diameter pipe member 23 is in close contact with an inner circumferential surface of the large-diameter pipe member 21, the likelihood of cracking is reduced. Furthermore, since need of a weld joint between the large-diameter pipe member 21 and the small-diameter pipe member 23 can be dropped, degradation of dimensional accuracy due to thermal strain caused by welding does not occur. Furthermore, the large-diameter-pipe bulging portion 45 and the large-diameter-pipe pipe-end expanding portion 41 are interposed between the small-diameter-pipe bulging portion 35 and the small-diameter-pipe pipe-end expanding portion 31 expanding outward in the radial direction. This restricts movements of the large-diameter pipe member 21 and the small-diameter pipe member 23 relative to each other in the direction along the pipe axis.

According to the above-described stepped pipe member production method, the small-diameter pipe member 23 is inserted into the reduced-diameter pipe portion 25 of the large-diameter pipe member 21, and the small-diameter pipe member 23 is radially expanded in a region facing the reduced-diameter pipe portion 25 of the large-diameter pipe member 21 so as to form the connection 30 where the large-diameter pipe member 21 and the small-diameter pipe member 23 are in close contact with each other. When the small-diameter pipe member 23 is radially expanded, in the small-diameter pipe member 23, the small-diameter-pipe pipe-end expanding portion 31 and the small-diameter-pipe bulging portion 35 are formed with the bracket 15 interposed therebetween in the axial direction. At the same time, the expansion of the small-diameter-pipe pipe-end expanding portion 31 causes the large-diameter pipe member 21 on the outer circumferential side to be deformed outward in the radial direction, thereby forming the large-diameter-pipe bulging portion 45. Furthermore, the expansion of the small-diameter-pipe bulging portion 35 causes the large-diameter pipe member 21 on the outer circumferential side to be deformed outward in the radial direction, thereby forming the large-diameter-pipe pipe-end expanding portion 41. The outer circumferential surface of the small-diameter-pipe pipe-end expanding portion 31 is brought into close contact with and brought into engagement with the inner circumferential surface of the large-diameter-pipe bulging portion 45. The outer circumferential surface of the small-diameter-pipe bulging portion 35 is brought, into close contact with and brought into engagement with the inner circumferential surface of the large-diameter-pipe pipe-end expanding portion 41.

Accordingly, in addition to the close contact of the small-diameter-pipe enlarged-diameter portion 33 and the large-diameter-pipe reduced-diameter portion 43 with each other and the securing of the small-diameter-pipe enlarged-diameter portion 33 and the large-diameter-pipe reduced-diameter portion 43 by radially expanding and swaging, a pair of engagement structures between which the large-diameter-pipe reduced-diameter portion 43 and the small-diameter-pipe enlarged-diameter portion 33 are interposed in the direction along the pipe axis are simultaneously formed.

Alternatively, instead of the bracket 15 used when the small-diameter-pipe enlarged-diameter portion 33 and the large-diameter-pipe reduced-diameter portion 43 are radially expanded and swaged, a detachable/attachable die (split die) may be used.

As has been described, according to the stepped pipe member production method having the structure described herein, after the small-diameter pipe member 23 has been inserted into the large-diameter pipe member 21, the small-diameter pipe member 23 and the large-diameter pipe member 21 are radially expanded and swaged so as to be secured. Thus, unlike the related art, the amount of heat input due to welding is not generated, and accordingly, degradation of dimensional accuracy due to thermal strain does not occur. Thus, the stepped pipe member such as beam member 13 can be easily assembled, and mounting accuracy can be improved.

As has been described, the present invention is not limited to the above-described embodiment. Combinations of the elements of the embodiment with each other and changes and application made by one skilled in the art based on the description herein and known techniques are also intended by the present invention and included in the scope for which protection is required.

The present application is based on Japanese Patent Application No. 2017-132798 filed in the Japan Patent Office on Jul. 6, 2017, the entire contents of which are incorporated herein by reference.

REFERENCE SIGNS LIST 13 beam member (stepped pipe member)
15 bracket (stiff member)
20 through hole
21 large-diameter pipe member
23 small-diameter pipe member
25 reduced-diameter pipe portion
27 tapered portion
29 electromagnetic forming coil (coil)
30 connection
31 small-diameter-pipe pipe-end expanding portion
33 small-diameter-pipe enlarged-diameter portion
35 small-diameter-pipe bulging portion
41 large-diameter-pipe pipe-end expanding portion
43 large-diameter-pipe reduced-diameter portion
45 large-diameter-pipe bulging portion

The invention claimed is:

1. A stepped pipe member comprising:
a connection in which one end portion of a large-diameter pipe member in an axial direction is secured to one end portion, in the axial direction, of a small-diameter pipe member having a smaller outer diameter than an outer diameter of the large-diameter pipe member,
wherein a large-diameter-pipe pipe-end expanding portion, a large-diameter-pipe reduced-diameter portion having a smaller outer diameter than an outer diameter of the large-diameter-pipe pipe-end expanding portion, a large-diameter-pipe bulging portion having a shape characteristic of a Lorentz force generated inside of the respective pipe members at a time when the small diameter pipe member is inserted in the large-diameter pipe member, and a larger maximum outer diameter than the outer diameter of the large-diameter-pipe reduced-diameter portion, and a tapered portion having a maximum outer diameter which is larger than the maximum outer diameter of the large-diameter-pipe bulging portion, and a minimum outer diameter which is smaller than the maximum outer diameter of the large-diameter-pipe bulging portion, are formed at the one end portion, in the axial direction, of the large-diameter pipe member so as to be continuous with one another in this order from a pipe end, wherein a small-diameter-pipe pipe-end expanding portion, a small-diameter-pipe enlarged-diameter portion having a smaller outer diameter than an outer diameter of the small-diameter-pipe pipe-end expanding portion, and a small-diameter-pipe bulging portion having a shape characteristic of a Lorentz force generated inside of the respective pipe members at a time when the small-diameter pipe member is inserted in the large-diameter pipe member, and a larger outer diameter than the outer diameter of the small-diameter-pipe enlarged-diameter portion are formed at the one end portion, in the axial direction, of the small-diameter pipe member so as to be continuous with one another in this order from a pipe end, wherein an inner circumferential surface of the large-diameter-pipe reduced-diameter portion is in close contact with an outer circumferential surface of the small-diameter-pipe enlarged-diameter portion, wherein an inner circumferential surface of the large-diameter-pipe bulging portion is engaged with an outer circumferential surface of the small-diameter-pipe pipe-end expanding portion, and wherein an inner circumferential surface of the large-diameter-pipe pipe-end expanding portion is engaged with an outer circumferential surface of the small-diameter-pipe bulging portion, wherein a stiffener is secured to an outer circumferential surface of the large-diameter-pipe reduced-diameter portion and wherein a length from a top of the lame-diameter-pipe bulging portion to the stiffener is larger than an expanding length defined by a free end of the small-diameter-pipe pipe-end expanding portion from the stiffener.

2. The stepped pipe member according to claim 1, wherein the expanding length of the small-diameter pipe pipe-end expanding portion from the stiffener is 5% to 30% of a width of the stiffener in the axial direction.

3. The stepped pipe member according to claim 1, wherein a length from a top of the small-diameter-pipe bulging portion to the stiffener is larger than an expanding length of the large-diameter-pipe pipe-end expanding portion from the stiffener.

4. The stepped pipe member according to claim 1, wherein an expanding length of the large-diameter-pipe pipe end expanding portion from the stiffener is 5% to 30% of a width of the stiffener in the axial direction.

5. The stepped pipe member according to claim 1, wherein a thickness of the large-diameter-pipe member is larger than a thickness of the small-diameter-pipe member.

* * * * *

UNITED STATES PATENT AND TRADEMARK OFFICE
CERTIFICATE OF CORRECTION

| | |
|---|---|
| PATENT NO. | : 11,774,013 B2 |
| APPLICATION NO. | : 16/623555 |
| DATED | : October 3, 2023 |
| INVENTOR(S) | : Yoshihaya Imamura et al. |

It is certified that error appears in the above-identified patent and that said Letters Patent is hereby corrected as shown below:

On the Title Page

Item (71), should read:
--(71) Applicant: Kobe Steel, Ltd., Kobe(JP); TOYOTA JIDOSHA KABUSHIKI KAISHA, Toyota (JP)--

Signed and Sealed this
Fifth Day of December, 2023

Katherine Kelly Vidal
*Director of the United States Patent and Trademark Office*